(12) United States Patent
Li et al.

(10) Patent No.: US 8,435,310 B2
(45) Date of Patent: May 7, 2013

(54) ANTI-COUNTERFEITING ELECTRONIC DEVICE AND METHOD THEREOF

(75) Inventors: Xiang Li, Shenzhen (CN); Sha-Sha Hu, Shenzhen (CN); Bo-Ching Lin, Tu-Cheng (TW); Hsien-Chung Shih, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/049,821

(22) Filed: Mar. 16, 2011

(65) Prior Publication Data
US 2012/0042169 A1 Feb. 16, 2012

(30) Foreign Application Priority Data
Aug. 16, 2010 (CN) .......................... 2010 1 0254339

(51) Int. Cl.
*G08B 13/00* (2006.01)
(52) U.S. Cl.
USPC ............................................ 726/35; 713/182

(58) Field of Classification Search ........................ None
See application file for complete search history.

(56) References Cited

U.S. PATENT DOCUMENTS

| 5,734,819 A * | 3/1998 | Lewis ............................. 726/29 |
| 2003/0172268 A1* | 9/2003 | Walmsley et al. ............. 713/168 |
| 2008/0181409 A1* | 7/2008 | Wang ............................. 380/277 |

FOREIGN PATENT DOCUMENTS

| CN | 2370477 Y | 3/2000 |
| CN | 1913680 A | 2/2007 |

\* cited by examiner

*Primary Examiner* — Cordelia Zecher
(74) *Attorney, Agent, or Firm* — Altis Law Group, Inc.

(57) ABSTRACT

An anti-counterfeiting electronic device includes a function component assigned with an identification code ID and a processor. The processor generates a random code K1 and transmits the random code K1 to the function component; the function component encrypts the random code K1 and the identification code ID to generate a key ID1. The processor further obtains the key ID1 from the function component and decrypts the key ID1 to generate an identification code ID2, and determines whether the identification code ID2 is the same as the ID and executes the system login command if the identification code ID2 is the same as the identification code ID. An anti-counterfeiting method is also provided.

9 Claims, 3 Drawing Sheets

ANTI-COUNTERFEITING ELECTRONIC DEVICE AND METHOD THEREOF

BACKGROUND

1. Technical Field

The present disclosure relates to electronic devices and, particularly, to an electronic device capable of detecting counterfeits and an anti-counterfeiting method thereof.

2. Description of Related Art

Manufacturers develop new electronic products regularly for meeting different customer's needs. Usually manufacturers invest a lot of labor and financial resources into the development of these products, however, many of these new electronic products are often counterfeited or forged, which badly influences the economic benefits of manufacturers.

BRIEF SUMMARY

The present disclosure relates to an anti-counterfeiting electronic device. The electronic device includes a function component assigned an identification code ID and a processor, wherein, the identification code ID is pre-burned into the function component, the processor is configured for generating a random code K1 and transmitting the random code K1 to the function component; the function component is configured for encrypting the random code K1 and the identification code ID to generate a key ID1; and the processor is further configured for obtaining the key ID1 from the function component and decrypting the key ID1 to generate an identification code ID2, determining whether the identification code ID2 is the same as the identification code ID and executes the system login command if the identification code ID2 is the same as the pre-stored identification code ID.

The present disclosure also relates to an anti-counterfeiting method of an electronic device, the electronic device comprises a processor and a function component, the method includes the following steps: generating a random code K1 by the processor; transmitting the random code K1 to the function component; receiving the random code K1 by the function component, and encrypting the random code K1 and the identification code ID according to an encryption algorithm to generate a key ID1 by the function component; transmitting the key ID1 to the processor; decrypting the key ID1 by the processor to obtain an identification code ID2 according to a decryption algorithm corresponding to the encryption algorithm; determining by the processor whether the identification code ID2 is the same as an identification code ID pre-stored in the electronic device; executing by the processor the system login command if the identification code ID2 is the same as the identification code ID.

The present disclosure also relates to an anti-counterfeiting electronic device. The electronic device includes a function component assigned an identification code ID and a processor, wherein, the identification code ID is pre-burned into the function component, the processor is configured for generating a random code K1 and transmitting the random code K1 to the function component; the function component is configured for encrypting the random code K1 and the identification code ID to generate a key ID1; and the processor is further configured for obtaining the key ID 1 from the function component and decrypting the key ID 1 to generate an identification code ID2, determining whether the identification code ID2 is the same as the identification code ID and executes the system login command if the identification code ID2 is the same as the pre-stored identification code ID, wherein the function component comprises a transceiver, a microprocessor and a cache; the identification code ID is burned into the cache, and the pin of the cache is destroyed to prevent the identification code ID from being copied.

BRIEF DESCRIPTION OF THE DRAWINGS

The components of the drawings are not necessarily drawn to scale, the emphasis instead being placed upon clearly illustrating the principles of an electronic device capable of anti-counterfeiting and anti-counterfeiting method thereof. Moreover, in the drawings, like reference numerals designate corresponding parts throughout several views.

DETAILED DESCRIPTION

Figure 1:
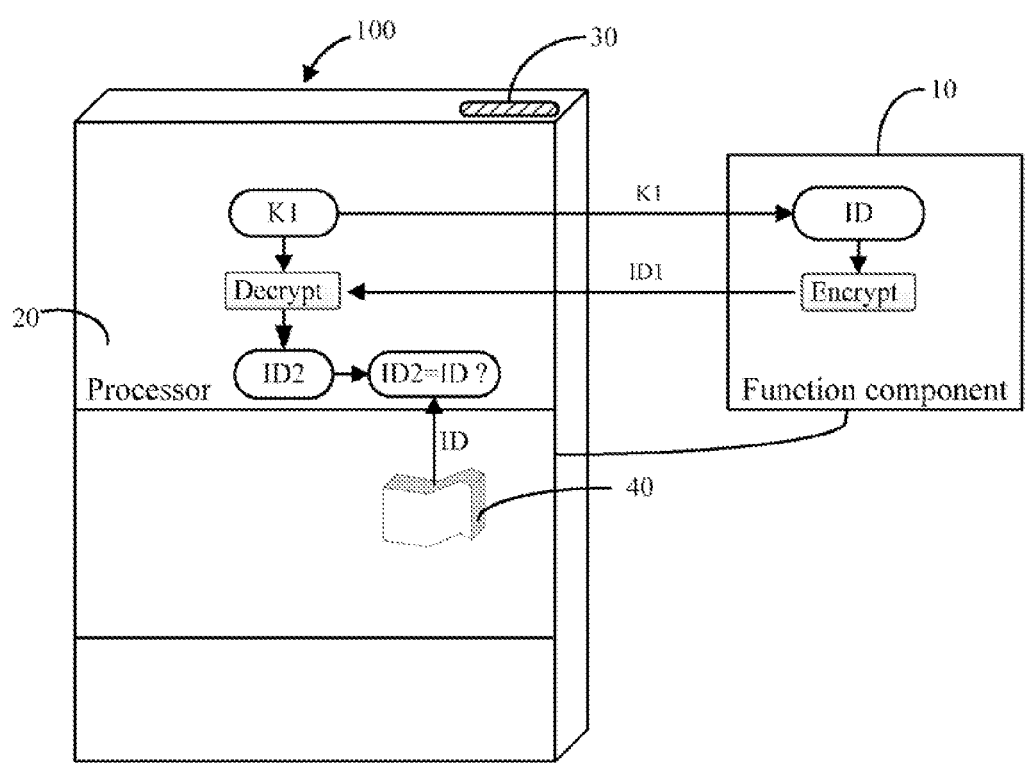
FIG. 1 is a schematic view, showing a path in which an electronic device transmits encrypted messages, in accordance with an exemplary embodiment.

FIG. 1 is a schematic view, showing a path in which an electronic device transmits encrypted messages in accordance with an exemplary embodiment. The electronic device 100 includes a function component 10, a processor 20, an input unit 30 and a storage unit 40. The processor 20 connects and transmits information to the function component 10 through a bus line (not shown). The function component 10 is assigned an identification code ID, and the identification code ID is pre-stored in a memory of the function component 10. When user operates the input unit 30 to start the electronic device 100, the processor 20 generates a random code K1 according to the power on signal, and transmits the random code K1 to the function component 10. The function component 10 encrypts the random code K1 and the identification code ID according to an encryption algorithm to generate a key ID1 and transmits the key ID1 to the processor 20. The processor 20 receives the key ID1 and decrypts the key ID1 to obtain an identification code ID2 according to a decryption algorithm corresponding to the encryption algorithm, and determines whether the identification code ID2 is the same as the identification code ID. The decryption algorithm and the identification code ID are pre-stored in the storage unit 40.

In the embodiment, the function component 10 is one of control chips of the electronic device 100 and is capable of executing an encryption operation for the identification code ID, for example, the function component 10 is an audio decoding chip, a bootstrap auto-run program is pre-stored in the audio decoding chip. Once the electronic device is booted up, the audio decoding chip executes the bootstrap auto-run program to encrypt the identification code ID to generate the key ID1 according to an encryption algorithm. The encryption algorithm is the symmetric encryption algorithm or the asymmetric encryption algorithm. The random code K1 includes a boot time or a random number for the random key K1 is varied, the key ID1 generated by encrypting the identification code ID and the random key K1 is also varied. Counterfeits can only obtain the encrypted key ID1 through testing the transmission signals, but cannot decrypt the key ID1 to obtain the identification code ID, which causes the electronic device 100 to not be able to login to the operation system for the obtained key ID1 does not match with the identification code ID.

Figure 2:
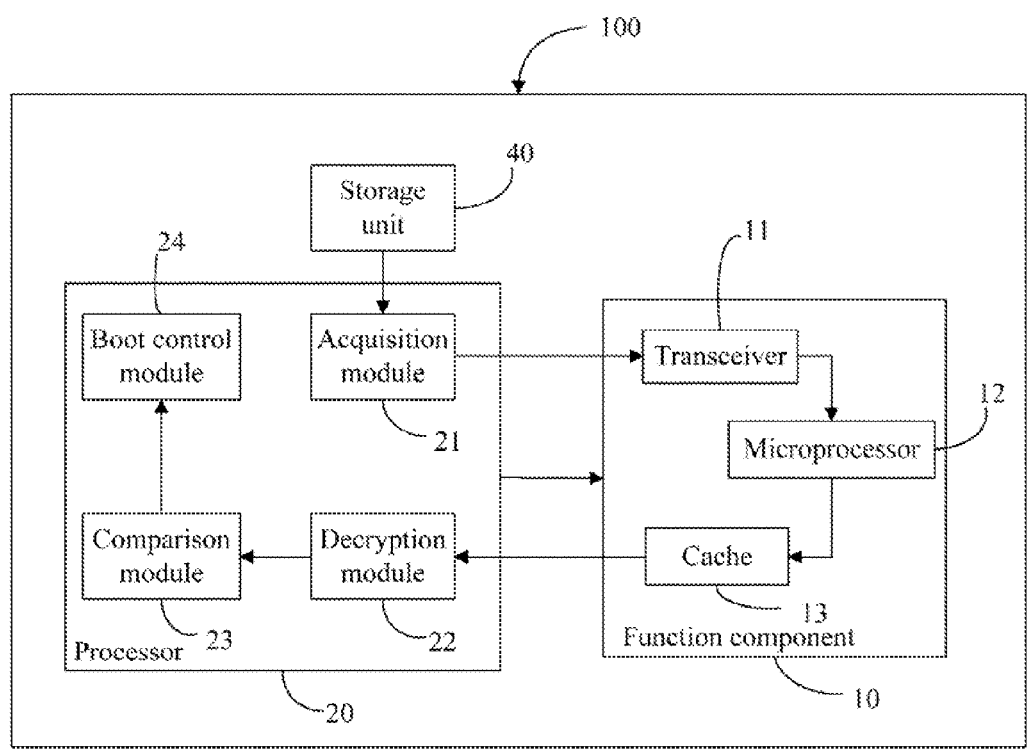
FIG. 2 is a block diagram of main function modules of a processor of the electronic device of FIG. 1, in accordance with an exemplary embodiment.

FIG. 2 is a block diagram of main function modules of a processor of the electronic device 100, in this embodiment, the function component 10 includes a transceiver 11, a microprocessor 12 and a cache 13. The identification code ID is burned into the cache 13, and the pin of the cache is destroyed to prevent the counterfeits from copying the identification code ID. During the powering on of the electronic device 100, the transceiver 11 receives the random code K1 transmitted from the processor 20, and sends the random code K1 to the microprocessor 12. The microprocessor 12 encrypts the identification code ID and the random code K1 to generate the key ID1 according to a preset encryption algorithm. Furthermore, the microprocessor 12 transmits the key ID1 via the transceiver 11 to the processor 20.

In the embodiment, the processor 20 includes an acquisition module 21, a decryption module 22, a comparison module 23 and a boot control module 24. When powering on the electronic device 100. The acquisition module 21 obtains a random code K1, for example, the acquisition module 21 obtains the current time information as the random code K1 from a real-time clock of the electronic device 100, and transmits the random code K1 to the function component 10 for encrypting the identification code ID to the key ID1. The decryption module 22 receives the key ID1 and decrypts the key ID1 to the identification code ID2 according to the decryption algorithm corresponding to the encryption algorithm. The comparison module 23 compares the identification code ID2 with the pre-stored identification code ID, if the identification code ID2 matches the identification code ID, the comparison module 23 generates a matching signal. The boot control module 24 executes the system login command to turn on the electronic device 100, otherwise, it executes the shutdown command.

Figure 3:
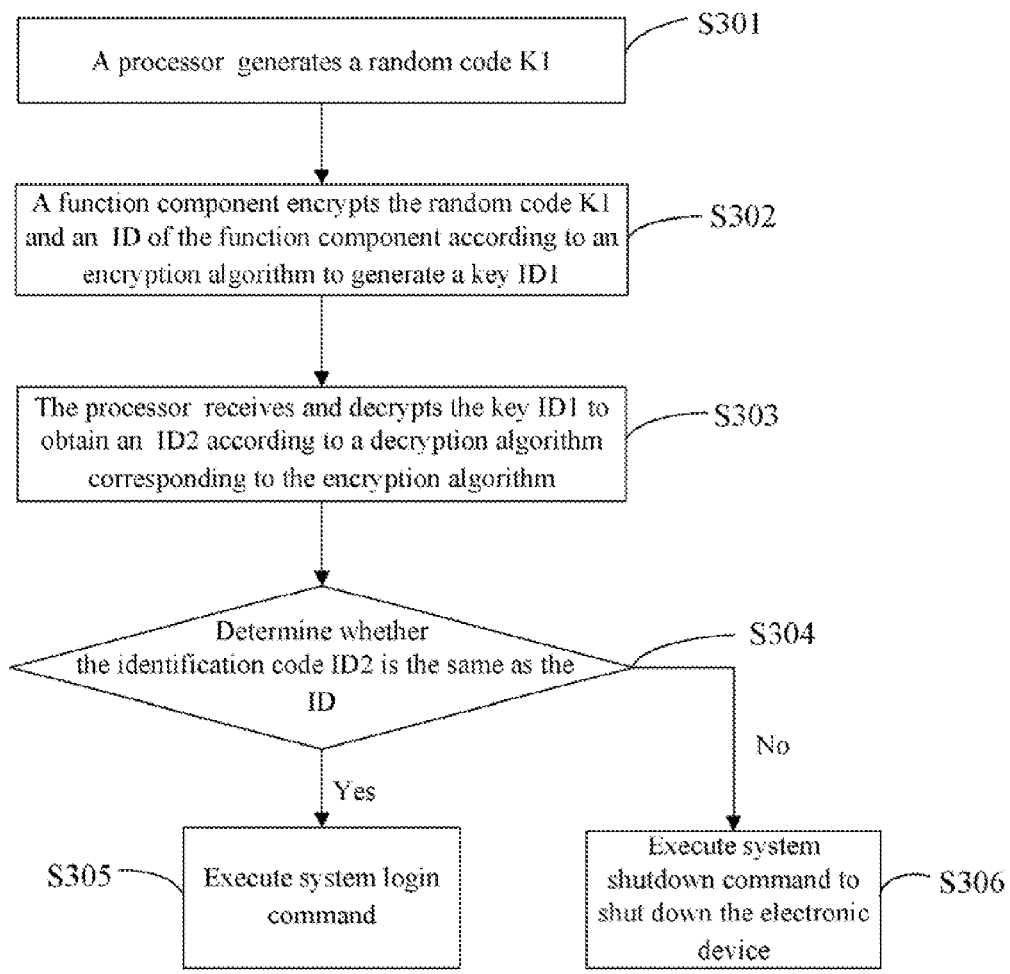
FIG. 3 is a flowchart of a method of anti-counterfeiting of the electronic device of FIG. 1, in accordance with an exemplary embodiment.

Referring to FIG. 3, a flowchart of a method of anti-counterfeiting of the electronic device of FIG. 1, in accordance with an exemplary embodiment. The electronic device 100 includes a processor 20 and a function component 10.

In step S301, the processor 20 generates a random code K1 and transmits the random code K1 to the function component 10.

In step S302, the function component 10 receives the random code K1, and encrypts the random code K1 and the identification code ID of the function component 10 according to an encryption algorithm generates a key ID1 and transmits the key ID1 to the processor 20. In the embodiment, the function component 10 includes a transceiver 11, a microprocessor 12, and a cache 13. The identification code ID is burned into the cache 13, and a pin of the cache 13 is destroyed to prevent the counterfeit from copying the identification code ID pre-stored in the cache 13. When powering on the electronic device 100, the transceiver 11 receives the random code K1 transmitted from the processor 20, and sends the random code K1 to the microprocessor 12. The microprocessor 12 encrypts the identification code ID and the random code K1 to generate the key ID1 according to a preset encryption algorithm. Furthermore, the microprocessor 12 transmits the key ID1 via the transceiver 11 to the processor 20.

In step S303, the processor 20 receives the key ID1 and decrypts the key ID1 to obtain an identification code ID2 according to a decryption algorithm corresponding to the encryption algorithm.

In step S304, the processor 20 determines whether the identification code ID2 is the same as the identification code ID.

In step S305, the processor 20 executes system login command if the identification code ID2 is the same as the identification code ID.

In step S306, the processor 20 executes system shutdown command to shut down the electronic device 100.

In another embodiment, if the identification code ID2 does not match the identification code ID, the processor 20 executes another function command, for example, it displays error messages to inform the users that the system cannot identify the functional component 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An anti-counterfeiting electronic device, comprising:
a function component assigned with an identification code ID and a processor, wherein, the identification code ID is pre-burned to the function component, the processor is configured for generating a random code K 1 and transmitting the random code K 1 to the function component; the function component is configured for encrypting the random code K1 and the identification code ID to generate a key ID1;
and the processor is further configured for obtaining the key ID1 from the function component and decrypting the key ID 1 to generate an identification code ID2, determining whether the identification code ID2 is the same as the identification code ID and executes the system login command if the identification code ID2 is the same as the pre-stored identification code ID; the function component comprises a transceiver, a microprocessor and a cache; the identification code ID is burned into the cache, and the pin of the cache is destroyed to prevent the identification code ID from being copied.

2. The electronic device as described in claim 1, wherein when powering on the electronic device, the transceiver receives the random code K1 transmitted from the processor, and transmits the random code K1 to the microprocessor; the microprocessor encrypts the identification code ID and the random code K1 to generate the key ID1 according to a preset encryption algorithm.

3. The electronic device as described in claim 1, wherein the processor executes system shutdown command to shut down the electronic device if the identification code ID2 is not the same as the pre-stored identification code ID.

4. The electronic device as described in claim 1, wherein the function component is a control chip of the electronic device and is capable of executing encryption operation for the identification code ID.

5. The electronic device as described in claim 1, wherein the random code K1 is the current time information provided by a real-time clock.

6. An anti-counterfeiting method of an electronic device, the electronic device comprises a processor and a function component, the method comprising:
generating a random code K1 by the processor;
transmitting the random code K1 to the function component;
receiving the random code K1 by the function component, and encrypting the random code K1 and the identification code ID according to an encryption algorithm to generate a key ID1 by the function component, wherein the identification code ID is pre-burned to a cache of the function component, and a pin of the cache is destroyed to prevent the identification code ID from being copied;
transmitting the key ID1 to the processor;

decrypting the key ID1 by the processor to obtain an identification code ID2 according to a decryption algorithm corresponding to the encryption algorithm;

determining by the processor whether the identification code ID2 is the same as an identification code ID pre-stored in the electronic device;

executing by the processor the system login command if the identification code ID2 is the same as the identification code ID.

7. The method as described in claim 6, wherein the function component is a control chip of the electronic device and capable of executing encryption operation for the identification code ID.

8. The method as described in claim 6, wherein the random code K1 is the current time information as provided by a real-time clock.

9. The method as described in claim 6, further comprising:

executing by the processor the shutdown command to shut down the electronic device if the identification code ID2 is not the same as the identification code ID.

* * * * *